US011988182B2

(12) United States Patent
Van Winkle

(10) Patent No.: US 11,988,182 B2
(45) Date of Patent: May 21, 2024

(54) INTEGRATED VEHICULAR REMOTE STARTING INTERRUPTER

(71) Applicant: Jeremy Allen Van Winkle, Little Elm, TX (US)

(72) Inventor: Jeremy Allen Van Winkle, Little Elm, TX (US)

(*) Notice: Subject to any disclaimer, the term of this patent is extended or adjusted under 35 U.S.C. 154(b) by 0 days.

(21) Appl. No.: 18/314,059

(22) Filed: May 8, 2023

(65) Prior Publication Data

US 2023/0358199 A1    Nov. 9, 2023

Related U.S. Application Data

(60) Provisional application No. 63/339,483, filed on May 8, 2022.

(51) Int. Cl.
*F02N 11/08* (2006.01)
*B60R 25/045* (2013.01)
*B60R 25/20* (2013.01)
*H04L 9/40* (2022.01)

(52) U.S. Cl.
CPC ........ *F02N 11/0807* (2013.01); *B60R 25/045* (2013.01); *B60R 25/209* (2013.01); *F02N 11/0862* (2013.01); *H04L 63/0435* (2013.01); *B60R 2325/108* (2013.01); *B60R 2325/205* (2013.01); *F02N 2300/306* (2013.01); *H04L 2463/121* (2013.01)

(58) Field of Classification Search
CPC ............. F02N 11/0807; F02N 11/0862; F02N 2300/306; B60R 25/045; B60R 25/209; B60R 2325/108; B60R 2325/205; H04L 63/0435; H04L 2463/121
USPC ....................................................... 701/113
See application file for complete search history.

(56) References Cited

FOREIGN PATENT DOCUMENTS

CA    2942498 C  *  9/2018  ........... B60R 25/209
RU    174506 U1 * 10/2017

OTHER PUBLICATIONS

RU174506U1 (Karipov et al.) (Oct. 18, 2017) (Machine Translation) (Year: 2017).*

* cited by examiner

*Primary Examiner* — Mahmoud Gimie
(74) *Attorney, Agent, or Firm* — Steven Rinehart

(57) ABSTRACT

A system and method of remotely enabling and disabling the starting of one or more vehicles using hardware components installed within a case and a data processing device (DPD), such as a smart phone, in logical communication with one of the vehicle and the case via a WAN, wherein an ignition request is relayed via the WAN to server which parses the ignition request into one or more encrypted ignition instructions, each encrypted ignition instruction sent to a separate vehicle exclusively associated with the encrypted ignition instruction.

11 Claims, 10 Drawing Sheets

INTEGRATED VEHICULAR REMOTE STARTING INTERRUPTER

BACKGROUND OF THE INVENTION

Field of the Invention

This invention relates to vehicular starting technologies and more particularly relates to a system and apparatus for interrupting and reenabling the starting of vehicles.

Description of the Related Art

Automobiles are typically powered by a lead battery or a lithium ion battery as known to those of skill in the art. Starting the engines in vehicles requires a starter which drains current from the battery, which starter is typically activated simply by turning a key. The battery is connected to the starter via the ignition switch inside the vehicle. The vehicle is disabled, or turned off, typically only by manually rotating a key, and there exists no efficient means in the art of disabling a vehicle remotely so that it cannot be started.

Rudimentary remotely-activated starters are known in the art, but these systems typically require a user keep in his possession a battery-powered key FOB with a range limited to a few dozen yards. These systems enable a vehicle to be started remotely from a limited range, but do not enable remote disabling of the starter. As increasingly numerous devices in users' lives interface with various radio-controlled devices, including garage doors, homes, cars, televisions, and even climate controls, the amount of radio controls which a user must maintain and keep in the user's possession compounds. It would be desirable in the art to have a means of starting and disabling a vehicle remotely from a distance not limited by the range of a typical radio-control such as a key FOB. It would desirable to have means in the art of disabling the starting of a plurality of vehicles remotely, such as a fleets of automobiles, boats, tractors, boats, motorhomes, motorcycles, electric bicycles, off-highway, vehicles, four-wheelers, tractors and equipment.

It is an object of the present invention is to provide a device which interfaces with specifically-engineered hardware components remotely to disable the starting of a plurality of vehicles from a single data-processing device, or to enable use and starting of the vehicle.

SUMMARY OF THE INVENTION

From the foregoing discussion, it should be apparent that a need exists for an integrated vehicular interrupter. Beneficially, such a system would overcome many of the difficulties of the prior art by providing a method of remotely enabling or disabling a vehicle to be started, the steps of the method comprising: combining a plurality of hardware components into a waterproof case, the plurality of hardware components including a battery, a switch, a PCB, a wireless module having a universally unique identifier (UUID), service wires, and a GPS module; installing the waterproof case within the vehicle within the electrical circuit providing power to operate said vehicle; initiating an ignition request using a mobile software application on a data processing device (DPD) in logical communication with the hardware components via a WAN, or BLE connection, the ignition request comprising: a unique identifier exclusively associated with the vehicle, one or more enabling timestamps and one or disabling timestamps, and the name of a user originating the ignition request; creating one or more encrypted ignition instructions consisting of less than all of the information contained in a corresponding ignition request; relaying each encrypted ignition instruction to a vehicle exclusively-associated with a single encrypted ignition instruction; storing all ignition requests and encrypted ignition instructions in persistent computer-readable memory; and outputting power from the waterproof case to a vehicle in response to one or more of the hardware components decrypting and an encrypted ignition instruction, said output power enabling the vehicle to be started and used.

The hardware components may further comprise a breaker. The waterproof case may be installed in one of an ignition system wiring and ignitions relays or starter solenoid, or electric motor wiring for electric vehicles. The ignition request may further comprise a map within use of the vehicle is authorized, and GPS coordinates of one of the user and the vehicle. The switch may be installed at any installation point where a completed circuit enables operation of the vehicle.

The vehicle control module may be configured to disable the vehicle by cutting power emanating from the waterproof case in response to one or more of: the vehicle traveling outside the boundaries of the map and expiration of a disabling timestamp.

In some embodiments, the ignition request further comprises a Boolean expressing as true to indicate power should be supplied by the switch to the starter of the vehicle. The ignition request may further comprises a plurality of packets, each packet exclusively associated with unique identifier, each unique identifier exclusively associated with a separate vehicle.

The steps of the method may further comprise: parsing, by means of a mobile software application on the server, the ignition request into a plurality of encrypted ignition instructions, each encrypted ignition instruction exclusively-associated with a separate vehicle; and relaying via the WAN each encrypted ignition instruction to a single vehicle exclusively associated with the encrypted ignition instruction.

The encrypted ignition instruction may be decrypted using a key comprising one or more of the UUID and the unique identifier exclusively-associated with the vehicle.

The method may further comprise two or more PCB boards and the steps of the method may further comprise connecting service cables directly to the starter.

The battery may comprise one or more lithium-ion cells.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
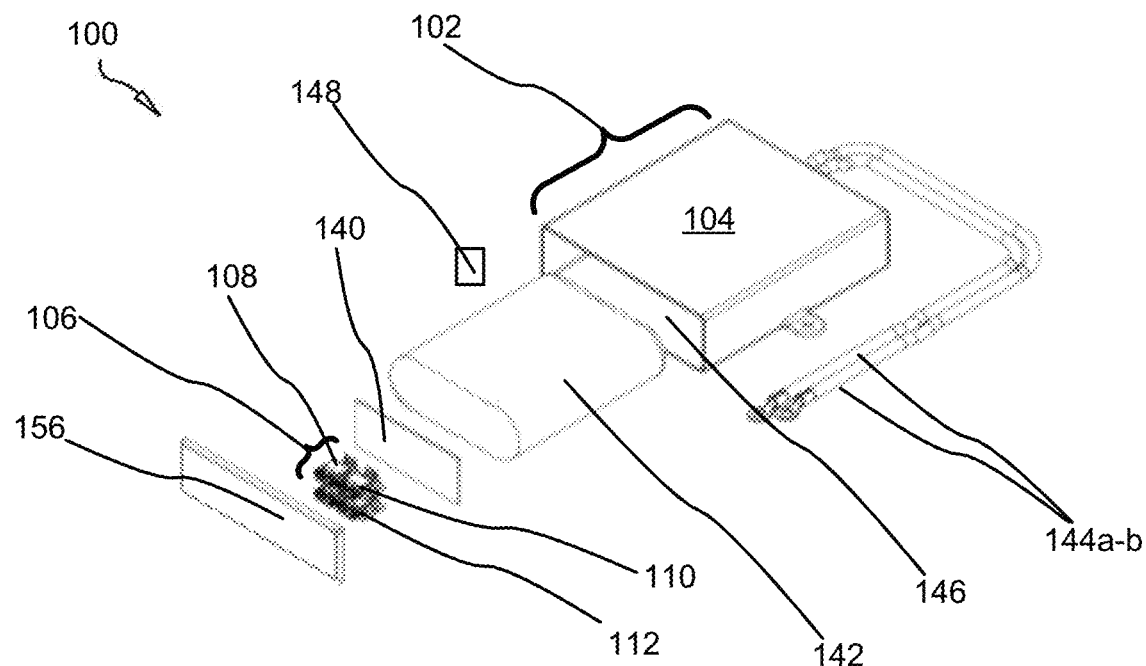
FIG. 1 is an exploded isometric view of an apparatus and system of remotely disabling and reenabling the starting of a vehicle in accordance with the present invention.

FIG. 1 is an exploded isometric view of an apparatus and system of remotely disabling and reenabling the starting of a vehicle 100 in accordance with the present invention.

The apparatus 100 comprises a housing 104 which may receive a power supply such as a lithium-based battery 142. The battery 142 may comprise a plurality of cells connected in series, or in parallel, within the housing 102, such that battery may power the device/apparatus 100 when the vehicle 304 is switched off. The housing 104 may be ovoid, cubic, rectangular, or square. In some embodiments, the housing 104 affixes within a steering column of the vehicle 304 and may be adapted to affix over the keyhole of the vehicle 304.

In various embodiments, the housing 104 comprises an open forward end 146 through which the cells 142 are inserted into the housing 104. A forward plate 140 may dispose over the open forward end 146. The forward plate 142 may slide into a track defined on, or by, the open forward end 146.

The faceplate 146 positions over the forward plate 140.

The apparatus 100 may also comprise one or more PCB boards 108 adapted to impart remote control over the switch 108 from a remote data-processing device (DPD) such as a smart phone in logical connectivity with the apparatus 100 via cellular network or WAN.

In accordance with embodiments of the invention, a system of remotely tracking and controlling vehicles 100 is provided. The system 100 includes a vehicle control module 102 operable to control an ignition system of a vehicle 101. The vehicle control module 102 includes a waterproof case 104, such as an injection molded case, operable to protect internal components of the vehicle control module 102. A printed circuit board 106 is contained within the vehicle control module 102. A microprocessor 108 is disposed on the printed circuit board 106.

A wireless module 110, such as a Bluetooth® module, may be disposed on the printed circuit board 106.

The apparati 100-300 may comprise means for relaying and receiving electrical signals enabling device-to-device communication between the DPD 111 and the module 102. The module 102 may be configured to make use of the Bluetooth® protocols and procedures enabling device-to-device intercommunication connectivity in lieu of making use of a WAN. This functionality may be provided by incorporating the Bluetooth Intercom Profile® and/or the Bluetooth Telephony Profile®, or other wireless technologies known to those of skill in the art.

This communication may be in accordance with core specifications of one or more subsets of Bluetooth® profiles, wherein the core specifications comprise one or more of: the Cordless Telephony Profile (CTP), the Device ID Profile (DIP), the Dial-up Networking Profile (DUN), the File Transfer Profile (FTP), the Hands-Free Profile (HFP), the Human Interface Device Profile (HID), the Headset Profile (HSP), and the Intercom Profile (ICP), the Proximity Profile (PXP).

The secondary cables 144a-b (or service cables) are adapted to be semi-permanently affixed to the internal battery 142 within the housing 104. In a default position, the switch 148 is spring-biased to return to a default position in which current to the power systems of the automobile 304 is disabled. The switch 148 may comprise a four-way switch or logic within the PCB enabling only virtual activation of the switch. When the switch is activated to an "on" position, operation and starting of the vehicle using standard means, such as a key are possible.

The apparatus 100 may be positioned in, spliced in, inserted into, or otherwise incorporated into the ignition system wiring, the ignition relays, and the starter solenoid, and/or starter motor or electric motor of an electric vehicle.

Figure 2:
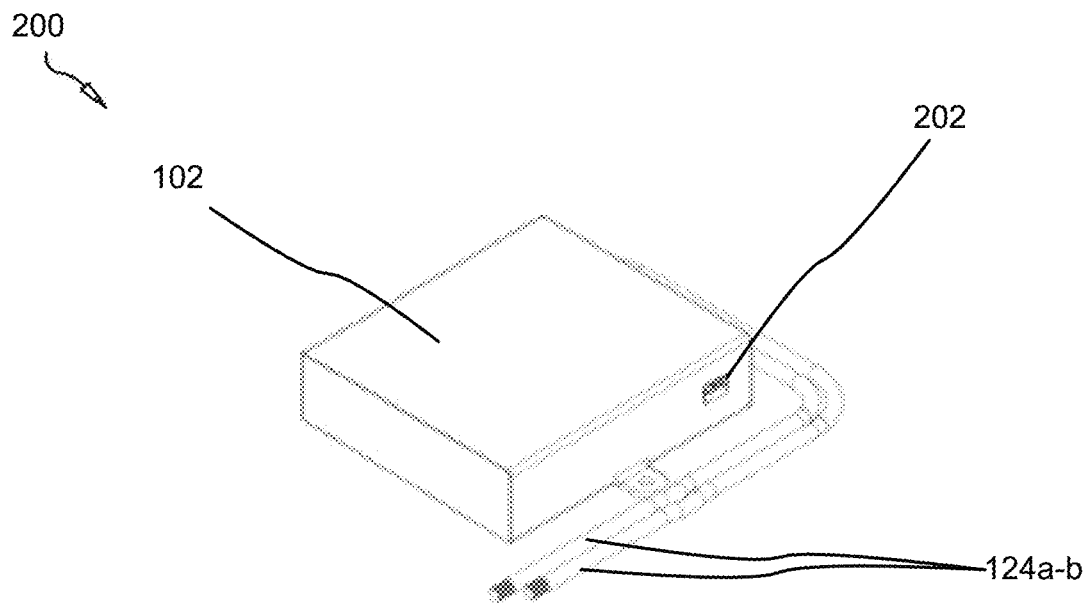
FIG. 2 is an isometric view of an apparatus and system of remotely disabling and reenabling the starting of a vehicle in accordance with the present invention.

FIG. 2 is an isometric view of an apparatus and system of remotely disabling and reenabling the starting of a vehicle 200 in accordance with the present invention.

The apparatus 100 may comprise a faceplate 156, which may have a plurality of controls, including a USB port for enabling direct interface with the apparatus 100, 200. The faceplate 146 may comprise a plurality of ports 202 for directing power to devices external to the apparatus 200, including, in some embodiments, USB ports as shown.

Figure 3:
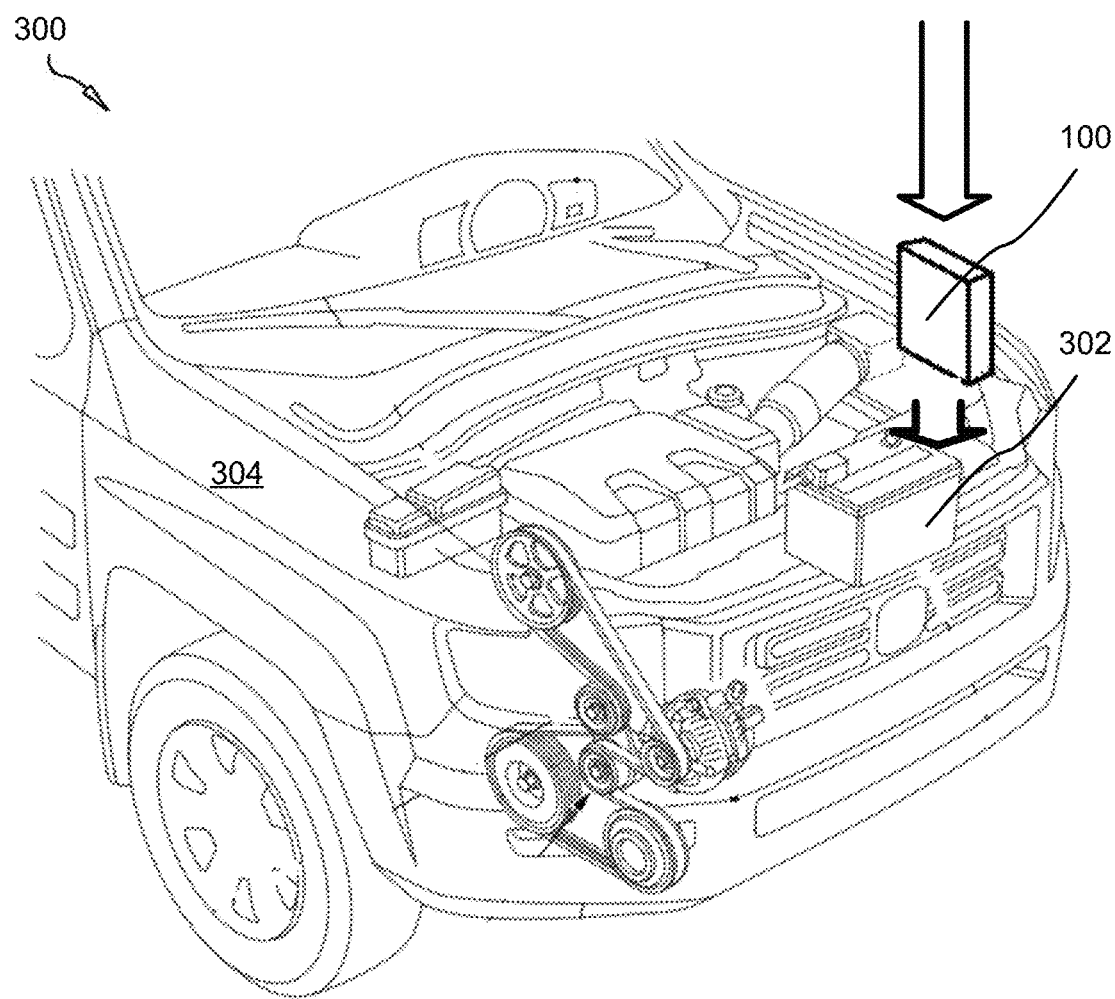
FIG. 3 is an environmental view of an apparatus and system of remotely disabling and reenabling the starting of a vehicle in accordance with the present invention.

FIG. 3 is an environmental view of an apparatus and system of remotely disabling and reenabling the starting of a vehicle in accordance with the present invention.

In various embodiments, the apparatus 100 positions at any installation point in the engine compartment, dashboard, steering column, or elsewhere where the device 100 may be spliced into a circuit whose completion enables operation of the power train of the vehicle 304.

Figure 4A:
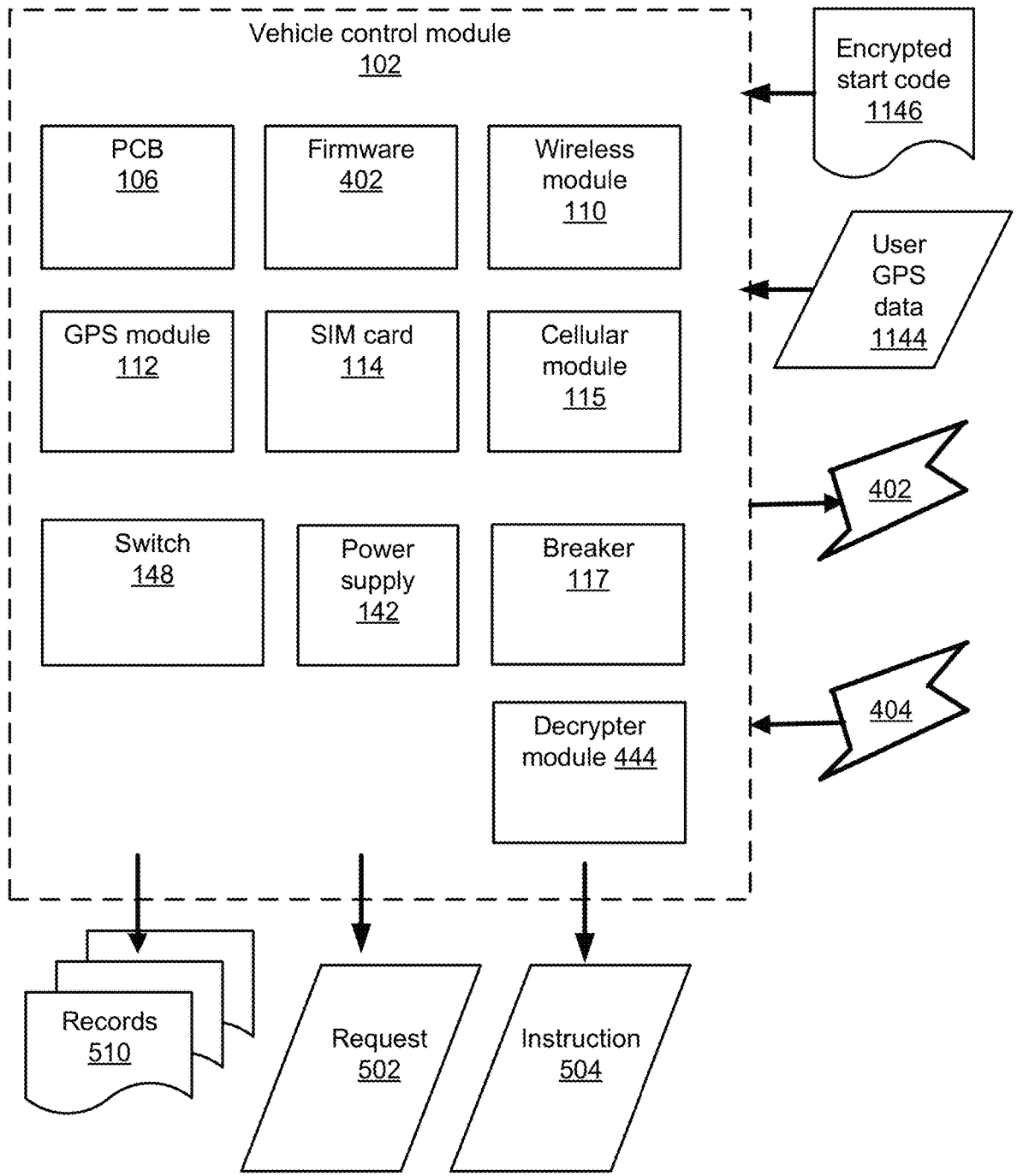
FIG. 4A is a block diagram illustrating one embodiment of a system for remotely disabling and reenabling the starting of a vehicle in accordance with the present invention.
Figure 4B:
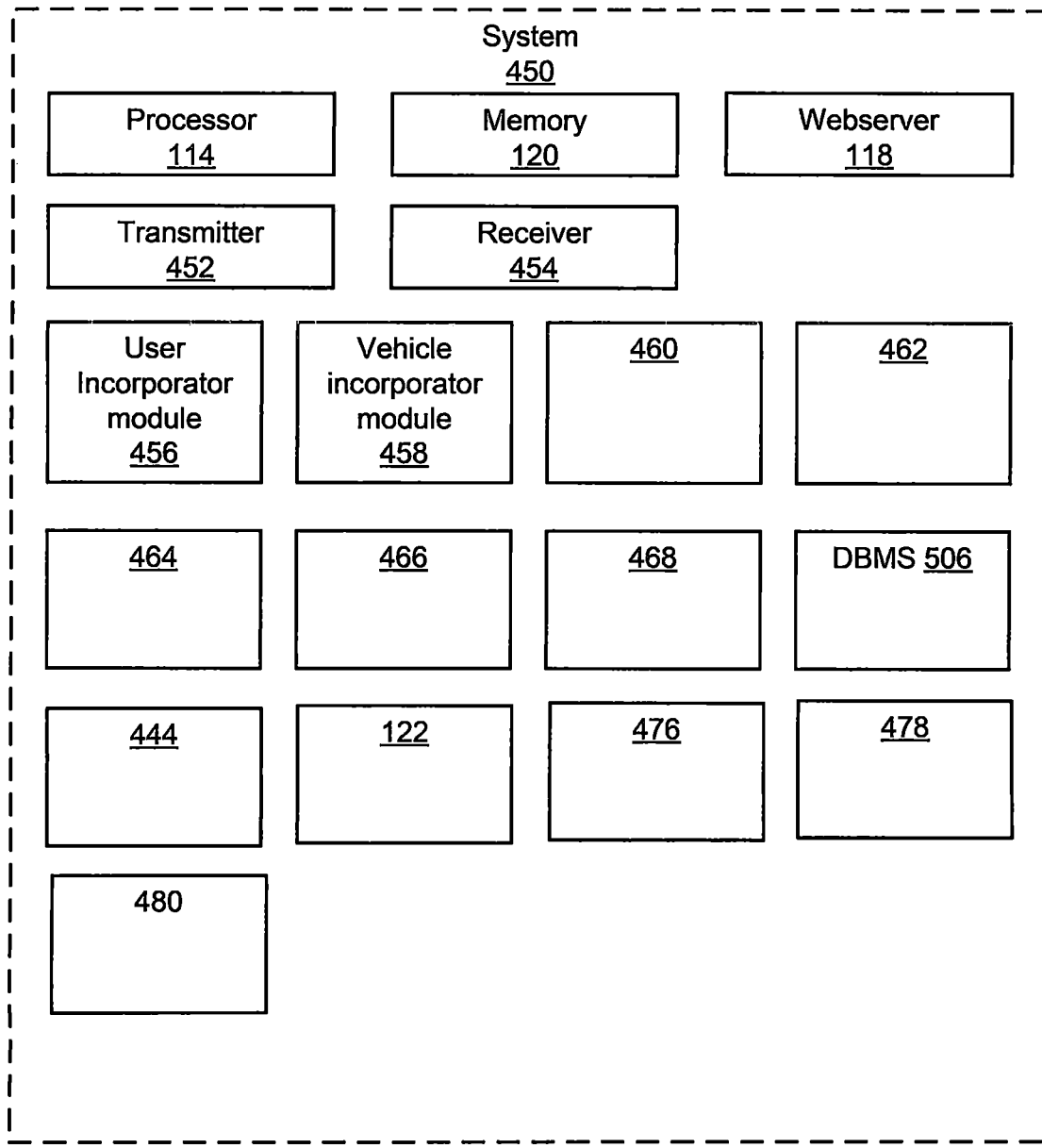
FIG. 4B is a block diagram illustrating one embodiment of a system for remotely disabling and reenabling the starting of a vehicle in accordance with the present invention.

FIGS. 4A-4B illustrate block diagrams illustrating embodiments of a system for controlling and tracking vehicles in accordance with the present invention.

The system 450 includes a centralized data processing server 118. A cloud database 120 is hosted on the centralized data processing server. The cloud database 120 hosted on the centralized data processing server 118 may include username, passwords, user contact information, vehicle identification number, and can be used to remote look up vehicle location via GPS or provide service to user reported problems. The system 100 includes a mobile software application 122 operable to communicate with the centralized data processing server 118.

The mobile software application 122 is operable to unlock upon verification an identity of a user through password or biometrics, such as fingerprints or facial recognition, for example. The mobile software application 122 is operable to wirelessly control the vehicle control module 102 to control an ignition system of a vehicle via a wireless connection between the wireless module 110 and a wireless module of mobile computing device.

The wireless module 110 is operable to communicate wirelessly with a mobile computing device, such as a smart phone 111. The wireless module 110 may include a universally unique identifier (UUID).

A GPS module 112 may be disposed on the printed circuit board 106. A SIM card 114 is disposed on the printed circuit board 106. A cellular module 115 may be disposed on the printed circuit board 106. The cellular module 115 and the SIM card 114 are operable to communicate a signal of the location of the GPS module 112 through a wireless telephone carrier network. A wiring harness 116 is operable to connect the printed circuit board 106 to a vehicle ignition system. For example, the wiring harness 116 includes CAN bus communication protocol, with wiring, plugs, and adapters to connect directly and communicate directly to vehicle ECU. An automatic breaker 117, such as a 20-amp breaker or higher, may be included in the vehicle control module 102.

The system 450 comprises a user incorporation module 456.

The user and manager 512 may comprise any person, company, or organization that is an owner or controller of a plurality of vehicles, tractors, boats or other machines, including electric vehicles and machines, including electrical bicycles, scooters, aircraft. Each user and/or manager 512 are incorporated into a management network comprising vehicles and users who have registered with the server 118. For the purposes of this patent, the terms "incorporate" and "incorporation" denote the act of formally enrolling a vehicle 304 and a user or manager 512 into the management network.

Managers 512 become incorporated when they create accounts with the server 118 by uploading personal identifying information, including one or more of: an address, a VIN of a vehicle, an email address, a telephone number, definition of purchasing practices, and the like. In typical embodiments, the registration takes place via a browser, but may also be sent to the server 118 using programs well-known to those of skill in the art, such as Microsoft Outlook, Thunderbird, Yahoo! Mail, and the like. In other embodiments, the users and/or managers 512 are incorporated by receiving personal information via an API from a social media provider such as Google®, Facebook®, Twitter®, Instagram®, Snapchat®, or other social media providers known to those of skill in the art.

The user incorporation module 456 is configured to incorporate the user or manager 512, who then incorporates the vehicle 304 using the vehicle incorporator module 458 which is configured to create unique identifiers in memory 120 exclusively associated with the vehicle 304, which identifiers may be encrypted.

In various embodiments, the module 102 includes GPS components to facilitate tracking of the vehicle 304. The device 100 may comprise motion sensors for detecting motion of the vehicle 304 and then relaying alerts to the server 118 or DPD 111. These motion sensors may be adapted to detect crashes, airbag deployments, and the like.

The system 450 includes a transmitter 452 for transmitting a wireless signal as well as receiver or transceiver 454 for receiving a wireless signal. In various other embodiments, the module 450 may comprise a geofencing module 460 adapted to disable the vehicle 304 in response to the vehicle traveling outside a predetermined geographic area or map, an alert module 462 adapted to send alerts to the technology provider and server 118 via the WAN or Bluetooth when a motion detector is triggered, a clock 464 for maintaining track of predetermined periods of time and cross referencing timestamps, an alarm module 466 for emitting a high frequency pitched sound in response to receiving an SOS alter from the DPD 111 or server 118, an appointment module 468 for receiving the locations service providers and scheduling appointments, and a decrypter module 444 for decrypting instructions 504 received from the user using various protocols such as BLE standard, manager 512 or server 118.

The mobile phone application 122 may be coded in C#, .NET or .NET 7, and may make use of SQL, mySQL, Oracle or other databases and RDBMSs 506. The mobile phone application include biometric recognition functions on the DPD 111 using means known to those of skill in the art, including fingerprint, facial recognition, retina scan, and the like.

Figure 5:
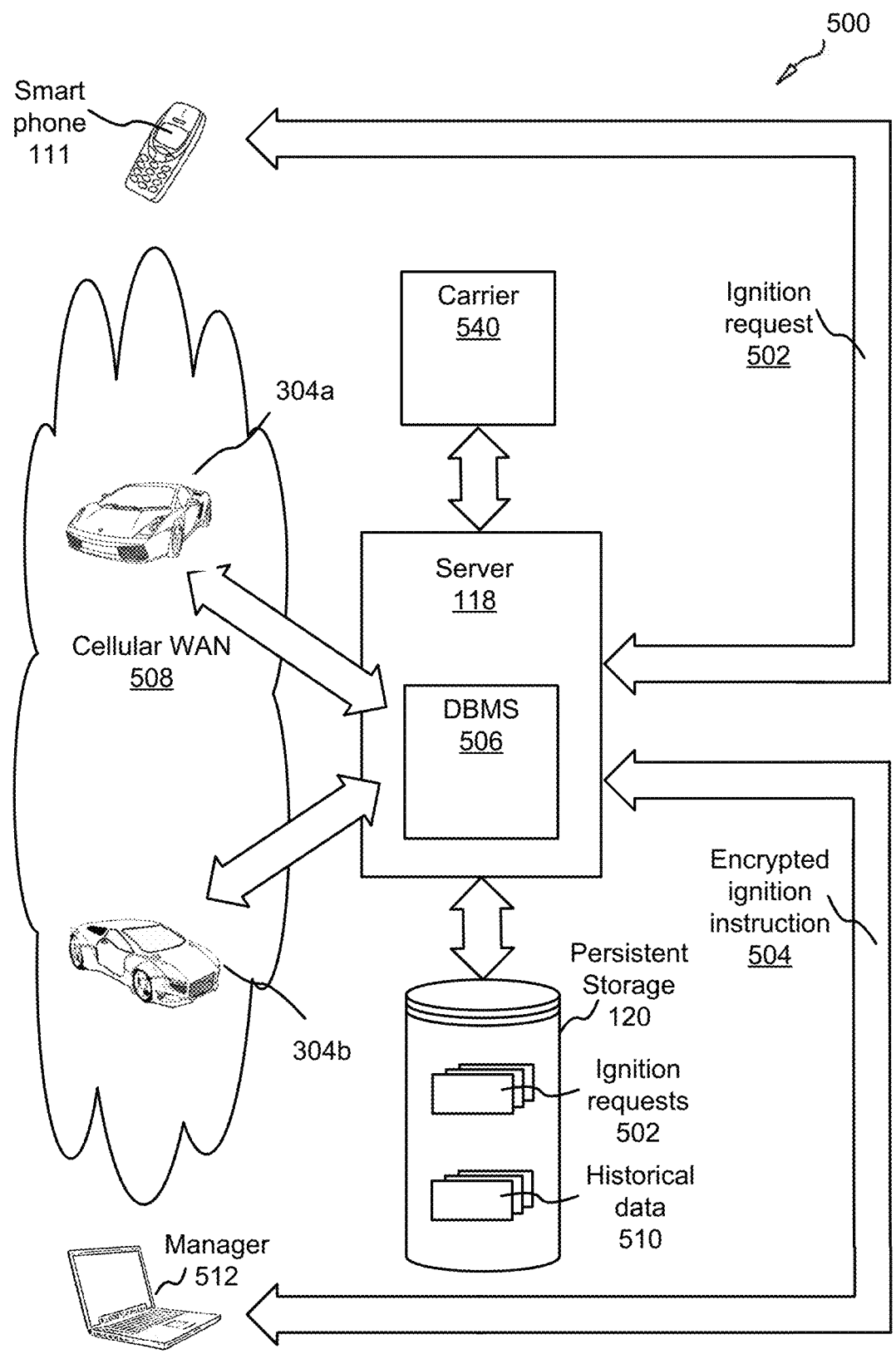
FIG. 5 is a data entity flow diagram illustrating one embodiment of a system for remotely disabling and reenabling the starting of a vehicle in accordance with the present invention.

FIG. 5 is a data entity flow diagram illustrating one embodiment of a system 500 for controlling and tracking vehicles in accordance with the present invention. Other leveraged programs and coding schemes may include Apple Xcode 14, JAVA, HTML and CSS.

In various embodiments, a user controlling a smart phone 111 initiates an ignition request 502 through a mobile software application 122 comprising a set of computer-readable instructions stored in persistent computer-readable memory on the phone 111.

This ignition request 502 may be encrypted using means known to those of skill in the art, and may comprise a computer-readable file stores in database memory which is uploaded via a WAN 508 such as a cellular network having a service area in which the phone 111 may be found.

The system 500 comprises a server 118, a database management system (DBMS) 506, persistent storage 120, stored ignition requests 502, and stored historical data 510.

Typically, the server 118 comprises one or more central processing units executing software and/or firmware to control and manage the other components within the system 500. In one embodiment, the server 118 comprises hardware and/or software more commonly referred to as a Multiple Virtual Storage (MVS), OS/390, zSeries/Operating System (z/OS), UNIX, Linux, or Windows system.

The server may comprise a server cluster with firewalls, load balancer, and database servers having Apache® and/or other software applications well-known to those of skill in the art. The server 118, in the shown embodiment, comprises a database management system (DBMS) 506 or relational database management system (RDBMS), such as Oracle, MySQL, SQL, FireBird, IBM DB2®, or the like.

The server 118 is in logical communication with one or more phone 111 and/or one or more managers 512 through a networked environment 508, such as local area network (LAN) or wide area network (WAN). The server 118 may communicate with phones 111 and/or managers 512, sending queues, ignition requests 502, and encrypted ignition instructions 504 using variations of the Simple Mail Transfer Protocol (SMTP), Internet Message Access Protocol (IMAP), BlueTooth, Post Office Protocol (POP), or other protocols well-known to those of skill in the art.

The manager 512 may comprise a smartphone or any DPD which, internally or externally, can communicate with the server 118.

In the present invention, the server 118 routes information between phones 111 and the manager 512.

In the present invention, as further described in detail above and below, users create ignition requests 502 on their phones 111 which are then relayed to the server 118. In alternative embodiments, the ignition requests 502 are created by the managers 512.

As shown, in various embodiments, a plurality of vehicles 304a-b, having vehicle control modules 102, are in logical communication with server 118.

These ignition requests 502 may comprise information about the vehicle 304 to be activated, including a Boolean indicating as true when a specified vehicle 304 is intended to enabled (or started) or disabled, a unique identifier exclusively associated with either the vehicle 304 or the vehicle control module 102 installed on the vehicle 304, a first timestamp indicating a time when the vehicle 304 will be activated and a second timestamp indicated when the vehicle 304 will be disabled. The various embodiments, the ignition request 502 comprises a plurality of unique identifiers exclusively associated with different vehicles 304a-b within a fleet or under the common control of a manager 512.

The ignition request 502 may be parsed into a plurality of encrypted ignition instructions 504, each ignition instruction relayed via the WAN 508 to a single vehicle 304. The vehicles' 304 vehicle control modules 102 may be adapted to start a vehicle 304 at a time indicated by the first timestamp and disable the vehicle at a time indicated by the second timestamp.

In some embodiments, the server 118 collects payment from a user before relaying an encrypted ignition instruction 504 to a vehicle 304 in accordance with a predetermined payment schedule mutually agreed upon by the user or a manager 512 and one or more of: an organization managing the server 118 and mobile software application 122.

In various embodiments, the WAN 508 is administered and under the control of a carrier 540.

The encrypted ignition instruction 504 may contain all of the information in the ignition request 502 which is exclusively associated with a single vehicle 304.

Figure 6:
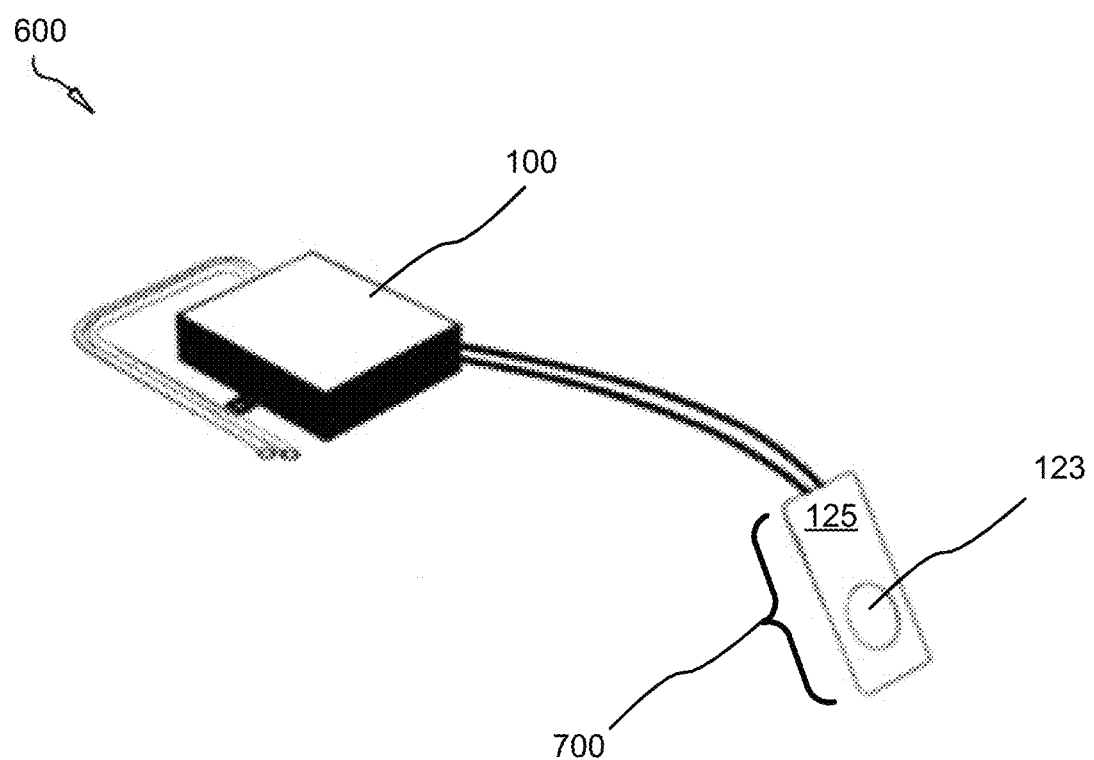
FIG. 6 is an isometric view of an apparatus and system of remotely disabling and reenabling the starting of a vehicle in accordance with the present invention.

FIG. 6 is an isometric view of an apparatus and system of remotely tracking and controlling vehicles in accordance with the present invention.

In various embodiments, the apparatus/system 100 is in logical communication with a graphical user interface 700.

Figure 7:
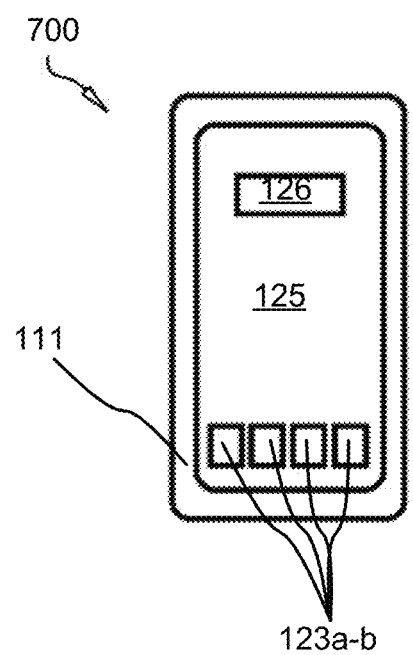
FIG. 7 is a graphical user interface of a mobile application of a system and method of remotely disabling and reenabling the starting of a vehicle on a smart phone in accordance with the present invention.

FIG. 7 is a graphical user interface of a mobile application of a system and method of remotely tracking and controlling vehicles on a smart phone in accordance with the present invention.

The mobile software application 122 is operable to display the location of the GPS module 112 that has been communicated from the vehicle control module 102. If a vehicle equipped with the vehicle control module 102 is outside of the range of a short field wireless connection between a mobile computing device and the wireless module 110, the mobile software application 122 is operable to control the vehicle control module 102 through the cellular module 115. The mobile software application 122 may be operable for Apple iOS and Google Android systems, for example.

Various buttons 123 and informational displays can be programmed into a graphical user interface 125 of the mobile software application 122, such as an unlock button 126 which can be triggered by facial recognition, pin code, or thumb print, a GPS location and map, login, and account setup. The mobile software application 122 may be operable for multiple users and multiple vehicles, such as a family that owns multiple cars or fleet rentals. A time out feature may be included to allow users to close the circuit for a period of time. For example, a user has the ability to start a vehicle open allowing the vehicle to turn on and off during this process. Once the time expires, the user will be required to once again authenticate through the application via facial recognition, thumb print, or pin ID to start the vehicle.

In an exemplary operation, once the vehicle control module 102 is wired into an ignition, a user will create an account using the mobile software application 122 and connect to the vehicle control module 102 via a Bluetooth connection and a specific unique ID code and/or through CAN bus communication protocol to allow only one account to be associated with the vehicle control module 102. Once paired, the ignition key can be placed into an on position. The user will then login into the mobile software application 122 and select vehicle. Once the vehicle is selected the user, can hit the unlock button to unlock mobile software application 122. An unlock sequence will begin with facial recognition, thumbprint scan, or a pin code. Once unlocked, the mobile software application 122 will send communication through a Bluetooth connection to the wireless module 110 and the microprocessor 108 will send communication to allow the ignition circuit to be used, thereby starting the vehicle.

Figure 8:
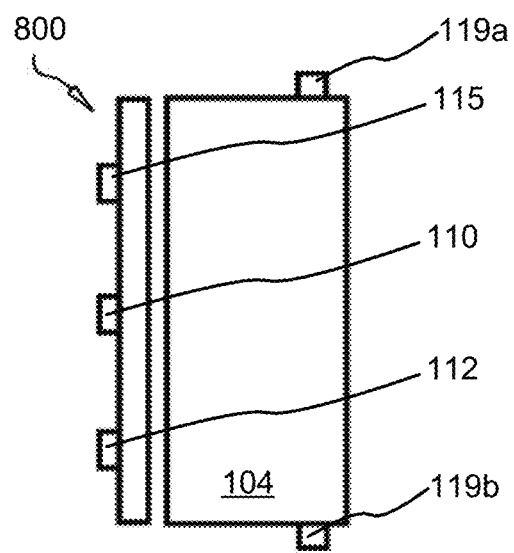
FIG. 8 depicts a vehicle control module of a system and method of remotely disabling and reenabling the starting of a vehicle in accordance with embodiments of the present invention.

FIG. 8 depicts a vehicle control module of a system and method of remotely tracking and controlling vehicles in accordance with embodiments of the present invention.

A pigtail connection 119 may be used to wire the vehicle control module 102 into a vehicle. The pigtail connection 119 includes 4 wires—hot, ground, ignition in 404, and ignition out 402. In one embodiment, the vehicle control module 102 includes functionality operable to serve as a key fob, which is frequently required to be detected by a vehicle as a condition to start the ignition.

Figure 9:
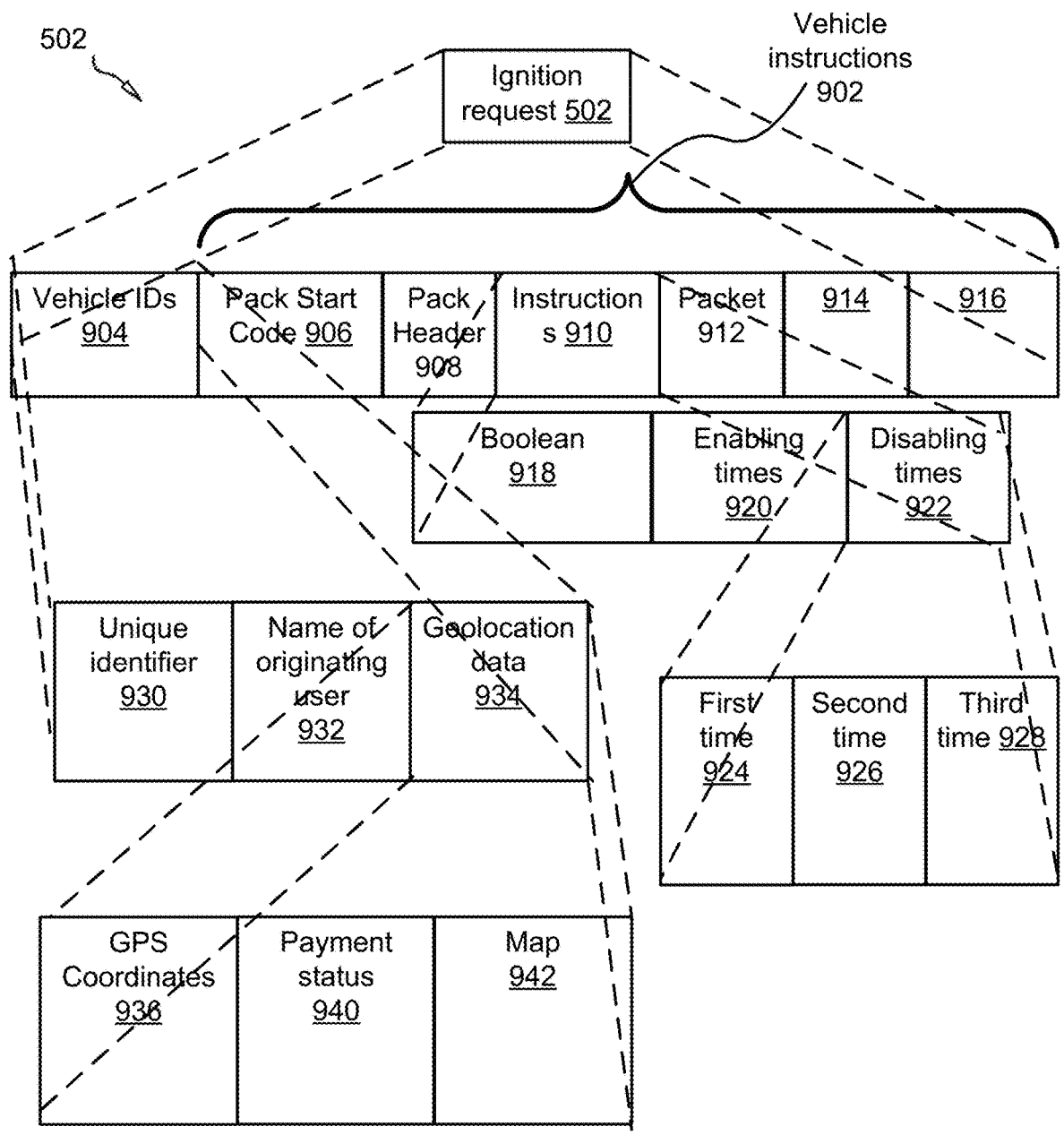
FIG. 9 illustrates a data layout diagram of an ignition request of a system and method of remotely disabling and reenabling the starting of a vehicle in accordance with embodiments of the present invention.

FIG. 9 illustrates a data layout diagram of an ignition request 502 of a system and method of remotely tracking and controlling vehicles in accordance with embodiments of the present invention.

The ignition request 502 comprises one or more packets 904 of vehicle identifying information. This packet 904 may comprise a unique identifier 930 exclusively associated with a vehicle, the name of a user 932 controlling a DPD 111, and geolocation data 934 of the phone 111 and/or the vehicle 304, including GPS coordinates 932, and a map 942 defining a predetermined geographic area within which use of the vehicle 304 is authorized. Should the vehicle 304 exit the geographic area defined by the map 942, the module 102 is adapted to automatically disable the vehicle 304. In this manner, the vehicle 304 is geofenced within a predetermined geographic area. The ignition request 502 may comprise a plurality of packets 904 which are parsed by the server 118 into smaller encrypted instructions 504 relayed to individual vehicles 304.

The ignition request 502 may comprise packet headers 908 and packet codes 914, 916, including HTML instructions. Each ignition request 502 comprises instructions 910, which is a packet or list of information containing instructions about when to activate, start or disable a vehicle 304, including a Boolean expressing as true or false indicating a start command for the vehicle and one or enabling times 920 indicated times of day (or a date and time) when the vehicle 304 may be started as well as one or more disabling times 304 indicated a time of day 924, 926, 928 (or a date and time) when the vehicle 304 should be disabled. In various embodiments, a timeframe may be relayed to the vehicle 304 specifying a predetermined period of time within which the starter of the vehicle 304 should be disabled, such as 48 hours, ten days, and the like. All ignition requests 502 are stored as historical data in persistent storage 120 by the server 118.

Figure 10:
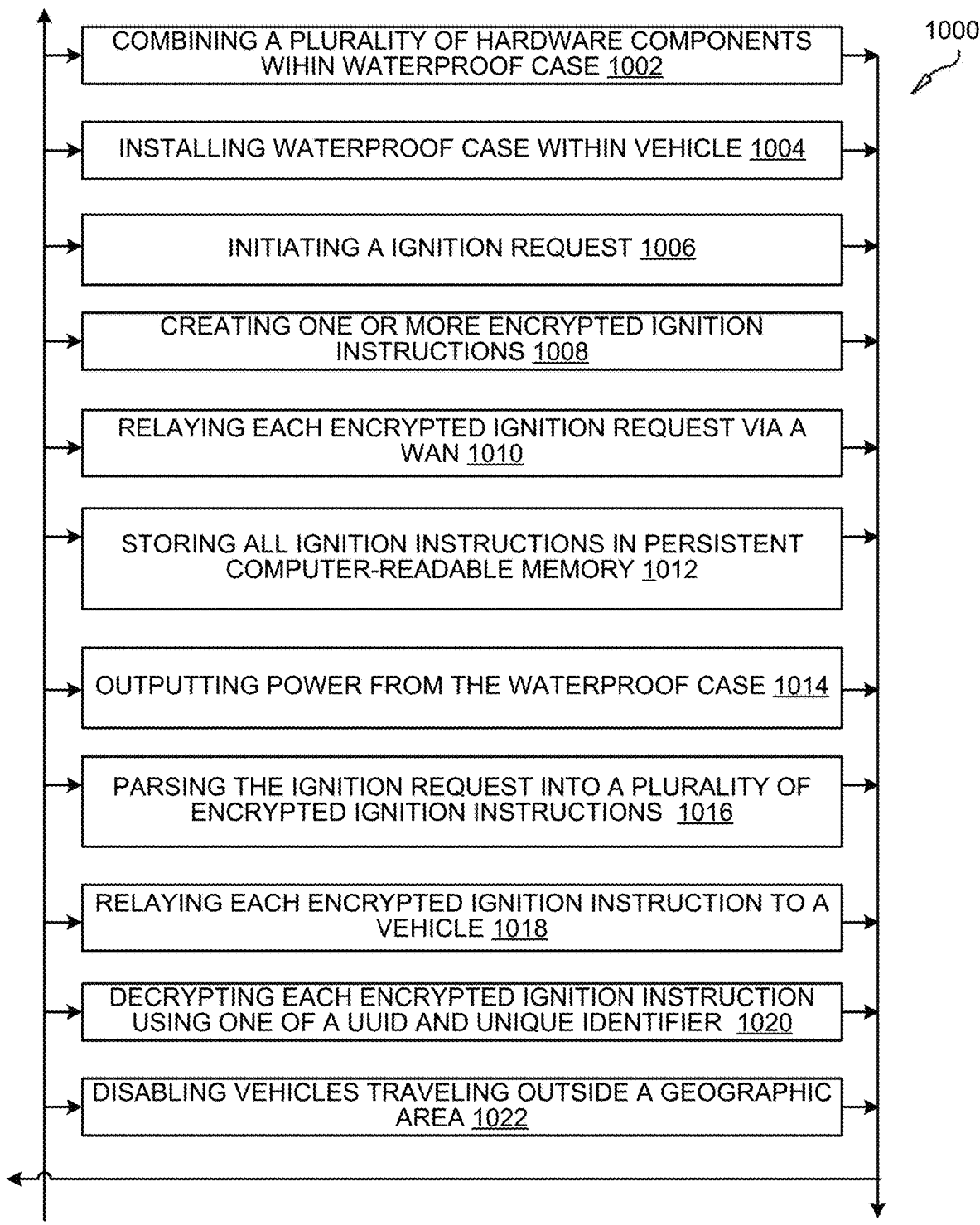
FIG. 10 illustrates the steps of a method 1000 of remotely disabling and reenabling the starting of a vehicle in accordance with embodiments of the present invention.

FIG. 10 illustrates the steps of a method 1000 of remotely tracking and controlling vehicles in accordance with embodiments of the present invention.

The method 100 comprises a step of combining 1002 a plurality of hardware components into a waterproof case, the plurality of hardware components including a battery, a switch, a PCB, a wireless module having a universally unique identifier (UUID), service wires, and a GPS module.

The waterproof case 102 is installed 1004 within the vehicle within the electrical circuit providing power to operate said vehicle. A DPD 111, operated by a user, initiates 1006 an ignition request 502 using a mobile software application on a data processing device (DPD) 111 in logical communication with the hardware components via a WAN, the ignition request 502 comprising: a unique identifier exclusively associated with the vehicle 304, one or more enabling timestamps 902 and one or disabling timestamps 922, and the name of a user originating the ignition request 502.

The server 118 creates 1008 one or more encrypted ignition instructions consisting of less than all of the information contained in a corresponding ignition request.

An encrypted ignition instruction 504 is relayed 1010 to a vehicle 304 exclusively-associated with a single encrypted ignition instruction, and all ignition requests and encrypted ignition instructions are stored 1012 in persistent computer-readable memory.

Power is output 1014 from the waterproof case 102 to a vehicle starter in response to one or more of the hardware components decrypting and an encrypted ignition instruction, said output power starting the vehicle.

In various embodiments, the request 502 is parsed 1016 into the instruction 504 which is relayed 1018 to the vehicle 304. The vehicle 304 may decrypt 1020 the instruction 504, and the vehicle 304 may disable itself in response to expiration of a timestamp 922 or the vehicle traveling outside a predetermined geographic area.

Figure 11:
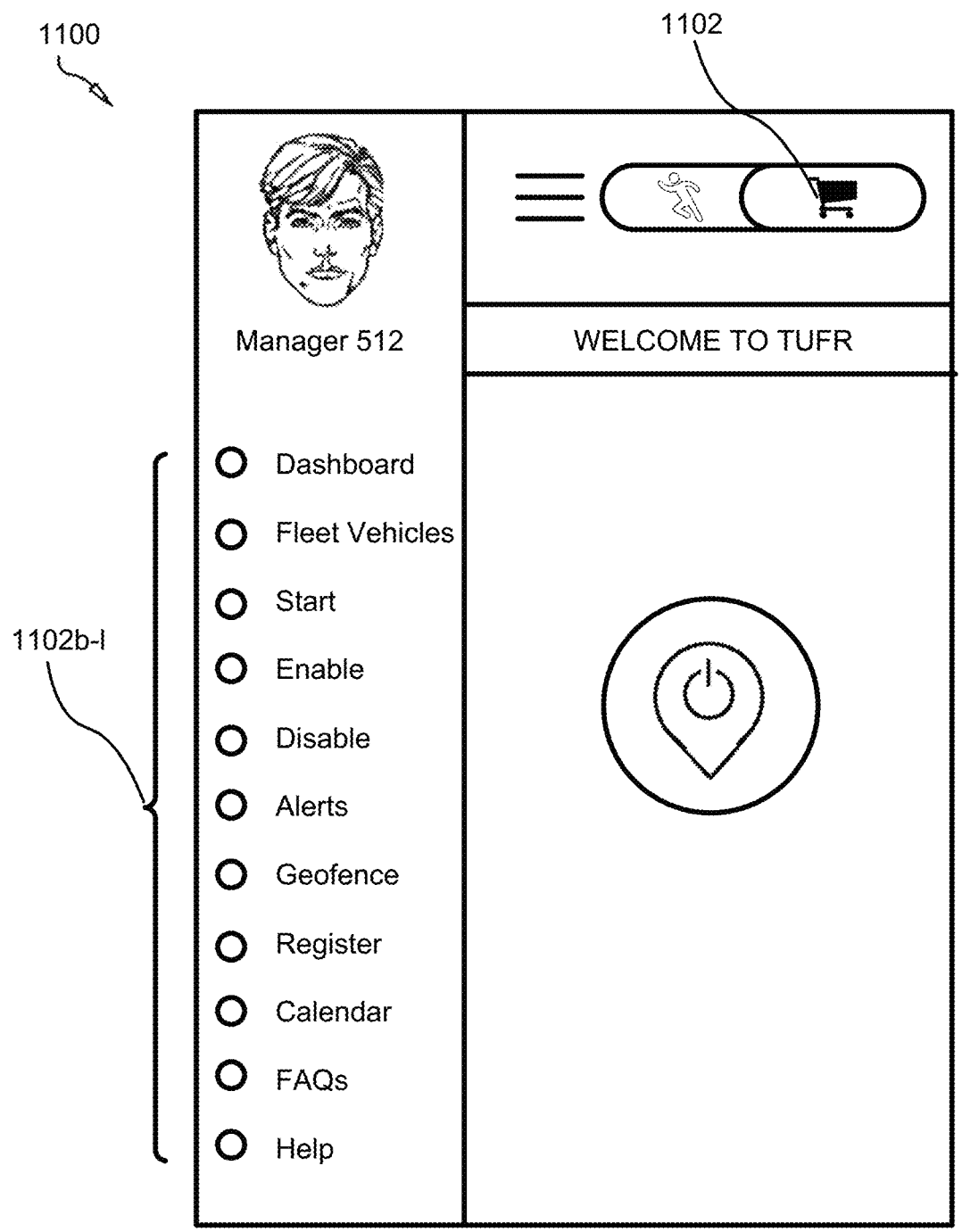
FIG. 11 illustrates an exemplary graphic user interface of a mobile phone application for remotely disabling and reenabling the starting and use of a vehicle in accordance with embodiments of the present invention.

FIG. 11 illustrates an exemplary graphic user interface 1100 of a mobile phone application 122 for remotely disabling and reenabling the starting of a vehicle 304 in accordance with embodiments of the present invention.

Various tactile controls 1102, or virtual controls 1102, position on the face of the interface 1100, each adapted to instruction the mobile phone application 122 to perform certain functions, including registering a vehicle using a registration module, seeing tables of vehicles 304 exclusively associated with a manager 512, starting a vehicle 304, disabling a vehicle 304, viewing itemized lists of alerts received from a vehicle including motion alerts, setting a map within which a vehicle 304 should be geofenced, registering a vehicle 304, and viewing a calendar of timeframes within which vehicles 304 may be active.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of remotely enabling a vehicle to be started, the steps of the method comprising:
    combining a plurality of hardware components into a waterproof case, the plurality of hardware components including a battery, a switch, a PCB, a wireless module having a universally unique identifier (UUID), service wires, and a GPS module;
    installing the waterproof case within the vehicle within the electrical circuit providing power to operate said vehicle;
    initiating an ignition request using a mobile software application on a data processing device (DPD) in logical communication with the hardware components via a WAN, the ignition request comprising: a unique identifier exclusively associated with the vehicle, one or more enabling timestamps and one or disabling timestamps, and the name of a user originating the ignition request;
    creating one or more encrypted ignition instructions consisting of less than all of the information contained in a corresponding ignition request;
    relaying each encrypted ignition instruction to a vehicle exclusively-associated with a single encrypted ignition instruction;
    storing all ignition requests and encrypted ignition instructions in persistent computer-readable memory; and
    outputting power from the waterproof case to a vehicle in response to one or more of the hardware components decrypting and an encrypted ignition instruction, said output power enabling the vehicle to be started and used;
    wherein the vehicle control module is configured to disable the vehicle by cutting power emanating from the waterproof case in response to one or more of:

the vehicle traveling outside the boundaries of the map and expiration of a disabling timestamp.

2. The method of claim 1, wherein the hardware components further comprise a breaker.

3. The method of claim 1, wherein the waterproof case is installed in one of an ignition system wiring and ignitions relays.

4. The method of claim 1, wherein the ignition request further comprises a map within use of the vehicle is authorized, and GPS coordinates of one of the user and the vehicle.

5. The method of claim 1, wherein the ignition request further comprises a Boolean expressing as true to indicate power should be supplied by the switch to the starter of the vehicle.

6. The method of claim 1, wherein the ignition request further comprises a plurality of packets, each packet exclusively associated with unique identifier, each unique identifier exclusively associated with a separate vehicle.

7. The method of claim 1, further comprising:
parsing, by means of a mobile software application on the server, the ignition request into a plurality of encrypted ignition instructions, each encrypted ignition instruction exclusively-associated with a separate vehicle; and
relaying via the WAN each encrypted ignition instruction to a single vehicle exclusively associated with the encrypted ignition instruction.

8. The method of claim 1, wherein the encrypted ignition instruction is decrypted using a key comprising one or more of the UUID and the unique identifier exclusively-associated with the vehicle.

9. The method of claim 1, further comprising two or more PCB boards.

10. The method of claim 1, further comprising service cables connected directly to the starter.

11. The method of claim 1, wherein the battery comprises one or more lithium-ion cells.

* * * * *